(12) United States Patent
Fujita et al.

(10) Patent No.: US 9,123,105 B2
(45) Date of Patent: Sep. 1, 2015

(54) IMAGE PROCESSING DEVICE, IMAGE PROCESSING METHOD, IMAGE CAPTURING DEVICE, COMPUTER PROGRAM, AND RECORDING MEDIUM

(75) Inventors: Takeo Fujita, Tokyo (JP); Daisuke Suzuki, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/346,347

(22) PCT Filed: Feb. 17, 2012

(86) PCT No.: PCT/JP2012/053791
§ 371 (c)(1),
(2), (4) Date: Mar. 21, 2014

(87) PCT Pub. No.: WO2013/061626
PCT Pub. Date: May 2, 2013

(65) Prior Publication Data
US 2014/0226915 A1    Aug. 14, 2014

(30) Foreign Application Priority Data
Oct. 26, 2011    (JP) .................................. 2011-234950

(51) Int. Cl.
| | |
|---|---|
| *G06K 9/40* | (2006.01) |
| *G06T 5/00* | (2006.01) |
| *H04N 5/217* | (2011.01) |
| *H04N 5/357* | (2011.01) |
| *G06T 5/20* | (2006.01) |

(52) U.S. Cl.
CPC ............... *G06T 5/002* (2013.01); *G06T 5/006* (2013.01); *G06T 5/20* (2013.01); *H04N 5/217* (2013.01); *H04N 5/3572* (2013.01); *G06T 2207/20024* (2013.01); *G06T 2207/20182* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 7,768,567 B2 * | 8/2010 | Azuma | ......................... 348/335 |
| 2010/0188535 A1 | 7/2010 | Mitsuya et al. | |
| 2011/0235888 A1 | 9/2011 | Takahashi | |

FOREIGN PATENT DOCUMENTS

| | | |
|---|---|---|
| JP | 2004-096665 A | 3/2004 |
| JP | 2006-166108 A | 6/2006 |
| JP | 2006-295807 A | 10/2006 |
| JP | 2007-188346 A | 7/2007 |
| JP | 2010-171753 A | 8/2010 |
| JP | 2011-204109 A | 10/2011 |
| JP | 4790247 B2 | 10/2011 |

* cited by examiner

*Primary Examiner* — Daniel Mariam
(74) *Attorney, Agent, or Firm* — Birch, Stewart, Kolasch & Birch, LLP

(57) ABSTRACT

An image processing device (21) is provided with: a noise suppression processor (23) for creating a noise-reduced image (NRs) by executing spatial filtering on a plurality of pixels, which fall within a reference range that includes a pixel of interest, in an input image (Is); and a distortion correction processor (24) for correcting distortion by local stretching or shrinking by a magnification factor (R) corresponding to the local amount of distortion in the noise-reduced image (NRs). The reference range is dynamically changed in accordance with the magnification factor (R). Control is performed so that the reference range becomes narrower as the magnification factor (R) increases.

19 Claims, 18 Drawing Sheets

DISTANCE L FROM IMAGE CENTER

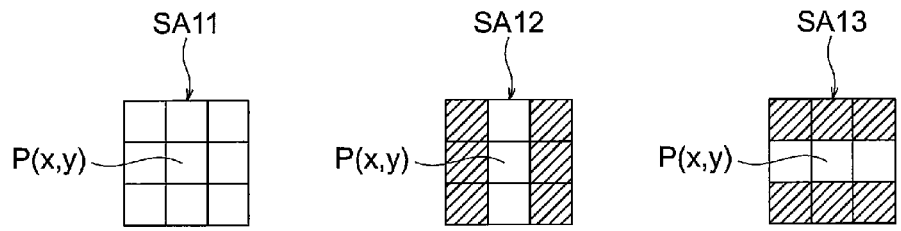
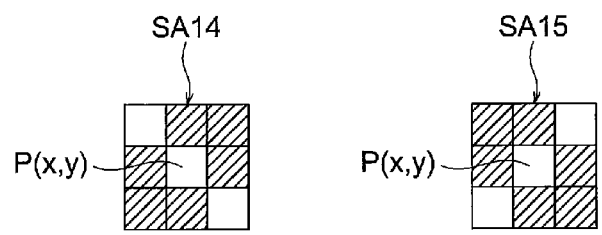
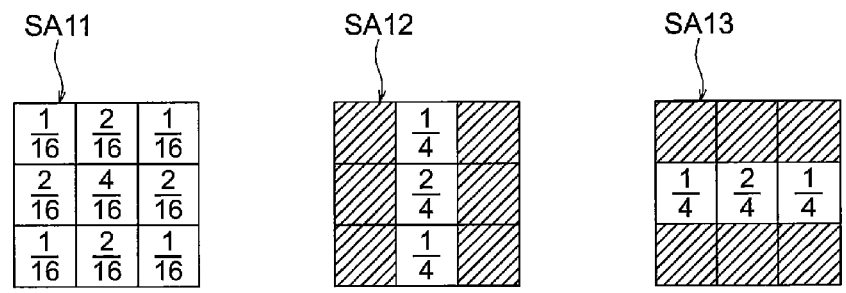

| MAGNIFICATION FACTOR R | | $-180 < \theta \leq -157.5$ | $-157.5 < \theta \leq -112.5$ | $-112.5 < \theta \leq -67.5$ | $-67.5 < \theta \leq -22.5$ | $-22.5 < \theta \leq 22.5$ | $22.5 < \theta \leq 67.5$ | $67.5 < \theta \leq 112.5$ | $112.5 < \theta \leq 157.5$ | $157.5 < \theta \leq 180$ |
|---|---|---|---|---|---|---|---|---|---|---|
| | $R \leq 2.0$ | SA11 | SA11 | SA11 | SA11 | SA11 | SA11 | SA11 | SA11 | SA11 |
| | $2.0 < R$ | SA12 | SA14 | SA13 | SA15 | SA12 | SA14 | SA13 | SA15 | SA12 |

FIG. 18

| | | θ | | | | | | | |
|---|---|---|---|---|---|---|---|---|---|
| | | -180 < θ ≦ -157.5 | -157.5 < θ ≦ -112.5 | -112.5 < θ ≦ -67.5 | -67.5 < θ ≦ -22.5 | -22.5 < θ ≦ 22.5 | 22.5 < θ ≦ 67.5 | 67.5 < θ ≦ 112.5 | 112.5 < θ ≦ 157.5 | 157.5 < θ ≦ 180 |
| MAGNIFICATION FACTOR R | R ≦ 2.0 | SA21/SA31 | SA21/SA31 | SA21/SA31 | SA21/SA31 | SA21/SA31 | SA21/SA31 | SA21/SA31 | SA21/SA31 | SA21/SA31 |
| | 2.0 < R ≦ 3.0 | SA22/SA32 | SA26/SA36 | SA24/SA34 | SA28/SA38 | SA22/SA32 | SA26/SA36 | SA24/SA34 | SA28/SA38 | SA22/SA32 |
| | 3.0 < R | SA23/SA33 | SA27/SA37 | SA25/SA35 | SA29/SA39 | SA23/SA33 | SA27/SA37 | SA25/SA35 | SA29/SA39 | SA23/SA33 |

FIG. 22

| MAGNIFICATION FACTOR R | BASE NOISE CLIP THRESHOLD VALUE THb | | | HIGH CLIP THRESHOLD VALUE THh | | | CORRECTION COEFFICIENT | | | |
|---|---|---|---|---|---|---|---|---|---|---|
| | $33_1$ | $33_2$ | $33_3$ | $34_1$ | $34_2$ | $34_3$ | $35_1$ | $35_2$ | $35_3$ | $35_4$ |
| 0.0 | 0 | 0 | 0 | 60 | 40 | 20 | 1.0 | 1.0 | 1.0 | 1.0 |
| 0.5 | 4 | 2 | 1 | 60 | 40 | 20 | 0.7 | 0.8 | 0.9 | 1.0 |
| 1.0 | 10 | 8 | 6 | 60 | 40 | 20 | 0.4 | 0.6 | 0.8 | 1.0 |
| 2.0 | 14 | 12 | 10 | 50 | 36 | 16 | 0.3 | 0.5 | 0.7 | 1.0 |
| 3.0 | 18 | 16 | 14 | 40 | 30 | 10 | 0.2 | 0.4 | 0.6 | 1.0 |

IMAGE PROCESSING DEVICE, IMAGE PROCESSING METHOD, IMAGE CAPTURING DEVICE, COMPUTER PROGRAM, AND RECORDING MEDIUM

TECHNICAL FIELD

The present invention relates to image processing techniques for suppressing noise components in image signals, more particularly to image processing techniques that suppress noise components and correct distortion in image signals that display distorted images.

BACKGROUND ART

Low pass filters are widely used to extract spatial components other than noise components from image signals in order to suppress the noise components in the image signals, but low pass filters have the drawback of also suppressing edge components of subject images in the image signals. Japanese Patent Application Publication No. 2007-188346 (Patent Reference 1), for example, discloses an image processor that can suppress noise components in an image signal while preserving edge components in the subject image.

FIG. 1 is a functional block diagram showing the configuration of an image processor 100 disclosed in Patent Reference 1. As shown in FIG. 1, the image processor 100 has low pass filters 101, 102, 103 that execute filtering on an input image signal, difference calculators 104, 105, 106, base noise clip circuits 107, 108, 109, and an adder 110. Difference calculator 104 outputs the difference between the input image signal and the output of low pass filter 101, difference calculator 105 outputs the difference between the outputs of low pass filters 101 and 102, and difference calculator 106 outputs the difference between the outputs of low pass filters 102 and 103. The low pass filters 102 and 103. The low pass filters 101, 102, 103 execute filtering with reference to the pixels in mutually differing ranges centered on a pixel of interest, so the difference calculators 104, 105, 106 may output signals with mutually differing spatial frequency components. The base noise clip circuits 107, 108, 109 receive the output signals of the difference calculators 107, 108, 109 and output fixed values when the received values are within prescribed ranges defined by threshold values (clip levels). Adder 110 adds the outputs of these base noise clip circuits 107, 108, and 109 to generate a pixel corresponding to the pixel of interest. Noise components in the image signal can be suppressed while preserving edge components of the subject image by appropriately setting the clip levels in the base noise clip circuits 107, 108, and 109.

PRIOR ART REFERENCES

Patent Reference

Patent Reference 1: Japanese Patent Application Publication No. 2007-188346 (FIG. 1, paragraphs 0009-0022)

SUMMARY OF THE INVENTION

Problems to be Solved by the Invention

Curvature distortion (also simply 'distortion') can occur due to distortion aberration of the lenses etc. in the imaging optics of digital cameras. Curvature distortion occurs in the image formed by the imaging optics because the image magnification factor (especially the horizontal magnification factor) differs between the vicinity of the central axis of the field angle and the surrounding area. When distortion aberration occurs, there is a tendency for the amount of distortion in the captured image to increase from the image center (the pixel corresponding to the central axis of the field angle of the imaging optics) toward the peripheral regions. It is therefore possible to perform a distortion correction by locally stretching or shrinking the captured image by a factor responsive to the amount of distortion.

If such a distortion correction is performed when the image is contaminated by noise, however, noise stretching becomes a problem that degrades image quality. For example, when a fisheye lens (ultra-wide-angle lens) is used as the imaging optics, it is possible to correct distortion due to the distortion aberration of the fisheye lens by magnifying the peripheral regions of the image more than the central part. In this case, the magnification factor is set so as to increase from the image center toward the peripheral regions. Here, the amount of distortion in the radiant direction (radial direction) differs from the amount of distortion in the concentric direction (circumferential direction), causing a discrepancy between the radial magnification factor and the concentric magnification factor. Therefore, if the image is contaminated with noise, the noise is stretched in a particular direction by the distortion correction, generating a visually unnatural corrected image in which the background of the subject image appears to drift.

In the image processor 100 in Patent Reference 1 as well, when a distortion correction is executed on the output image signal, it may stretch superimposed noise and degrade the image quality.

In view of the above, an object of the present invention is to provide an image processing device, an imaging device, an image processing method, a computer program, and a computer-readable medium that can reduce image quality degradation due to distortion corrections that stretch noise superimposed on a distorted image.

Means for Solving the Problem

An image processing device according to a first aspect of the invention has a noise suppression unit that executes spatial filtering on a plurality of pixels in a reference range including a pixel of interest in an input image, thereby generating a noise-reduced image; a distortion correction processor that locally deforms the noise-reduced image with a magnification factor responsive to a local amount of distortion in the noise-reduced image, thereby correcting distortion of the noise-reduced image; and a filtering control unit that dynamically changes the size of the reference range responsive to the magnification factor. The filtering control unit narrows the reference range as the magnification factor increases.

An image capturing device according to a second aspect of the invention includes the image processing device according to the first aspect.

An image processing method according to a third aspect of the invention includes the steps of executing spatial filtering on a plurality of pixels in a reference range including a pixel of interest in an input image and generating a noise-reduced image, locally deforming the noise-reduced image with a magnification factor responsive to a local amount of distortion in the noise-reduced image, thereby correcting distortion of the noise-reduced image, and dynamically changing the size of the reference range responsive to the magnification factor. In the step of dynamically changing the reference range, the reference range is dynamically changed by narrowing the reference range as the magnification factor increases.

A computer program according to a fourth aspect of the invention is read from a memory and causes a processor to execute the steps of the image processing method according to the third aspect.

A computer-readable recording medium according to a fifth aspect of the invention stores the computer program according to the fourth aspect.

Effects of the Invention

According to the first to fifth aspects of the invention, the reference range is changed so as to narrow as the amount of distortion increases, so it is possible to reduce image quality degradation caused when the correction of distortion of a distorted image stretches noise superimposed on the image.

BRIEF DESCRIPTION OF THE DRAWINGS

FIGS. 13(A) to 13(E) are drawings showing candidate 3 x 3-pixel reference ranges to be applied in a low pass filter.

FIGS. 14(A) to 14(C) are drawings showing exemplary weighting coefficients (filter coefficients) to be applied in the candidate reference ranges.

FIG. 17 is a drawing showing an exemplary lookup table for selecting a reference range to be applied in a low pass filter.

FIG. 18 is a drawing showing another exemplary lookup table for selecting a reference range to be applied in a low pass filter.

FIG. 22 is a drawing representing a lookup table in the third embodiment.

MODE FOR CARRYING OUT THE INVENTION

Embodiments of the invention will be described below with reference to the drawings.

First Embodiment

Figure 1:
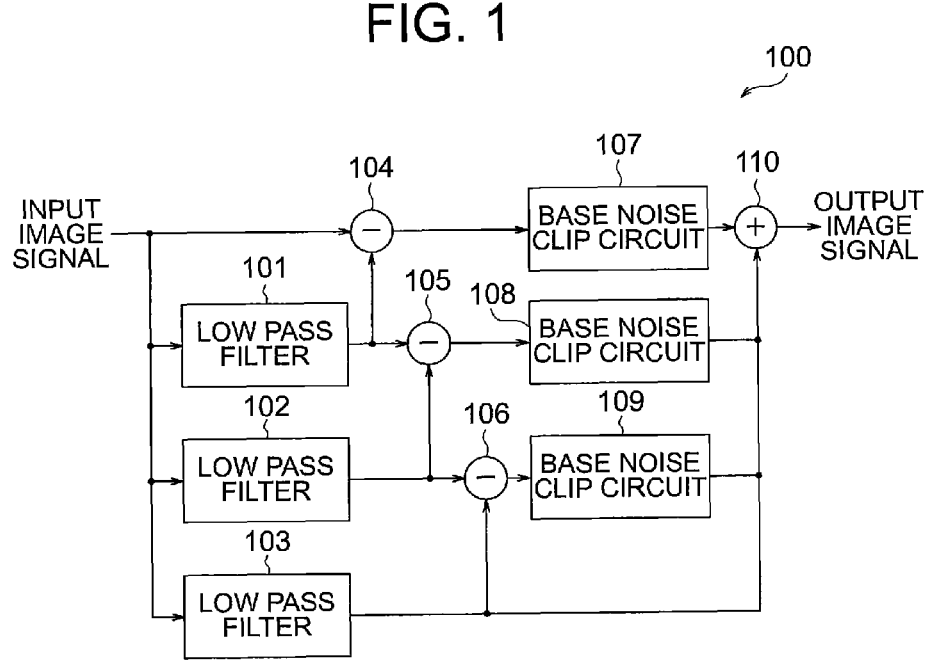
FIG. 1 is a functional block diagram showing the configuration of an image processor disclosed in Patent Reference 1.
Figure 2:
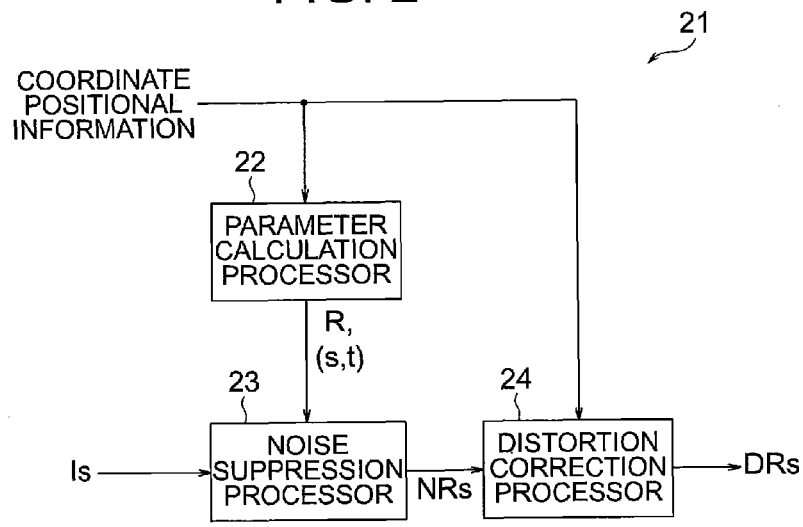
FIG. 2 is a functional block diagram schematically showing the configuration of the image processing device in a first embodiment of the invention.

FIG. 2 is a block diagram schematically showing the configuration of the image processing device 21 in the first embodiment of the invention. As shown in FIG. 2, the image processing device 21 includes a parameter calculation processor 22, a noise suppression processor 23, and a distortion correction processor 24.

The noise suppression processor 23 has the functions of executing a spatial filtering process, a clip process, and a noise suppression strength adjustment process on an input image Is by using noise suppression parameters R, s, and t, thereby reducing noise components in the input image Is. The parameter calculation processor 22 calculates the noise suppression parameters R, s, and t on the basis of the coordinate positional information of pixels constituting the input image Is.

The distortion correction processor 24 receives a noise-reduced image NRs from the noise suppression processor 23. The distortion correction processor 24 has the function of locally deforming (stretching or shrinking) the noise-reduced image NRs with a magnification factor R responsive to the local amount of distortion α of the noise-reduced image NRs, thereby correcting distortion of the noise-reduced image NRs. The magnification factor R is one of the noise suppression parameters. As described later, s and t denote the values (direction parameters) of a vector (s, t) indicating the direction of application of the magnification factor R.

In this embodiment, the input image Is is a digital image obtained when a solid-state image sensor performs photoelectric conversion on an optical image formed by the imaging optics of an imaging device. The distortion α occurs due to distortion aberration in the imaging optics and is measured ahead of time according to the image height from the field angle center of the imaging optics and the imaging conditions. Data giving the amount of distortion α are stored in a nonvolatile memory (not shown) in or external to the distortion correction processor 24, which can obtain the amount of distortion α corresponding to the position of the coordinates of a pixel of interest by reference to the nonvolatile memory.

Figure 3:
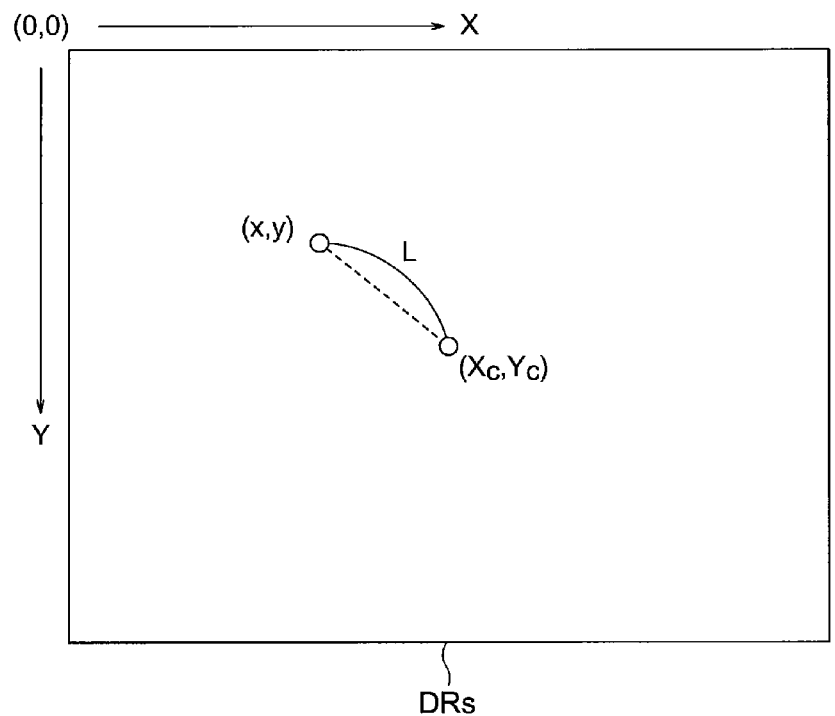
FIG. 3 is a drawing showing the relationship between the image center of an output image and the pixel being processed.

The distortion correction processor 24 first takes each pixel of an output image DRs, which is an ideal image after distortion is corrected, as the pixel of interest and, as shown in FIG. 3, calculates the distance L between the pixel of interest and the image center corresponding to the field angle center. The distance L is an amount corresponding to the ideal image height (image height when there is no distortion aberration) from the field angle center of the imaging optics. In FIG. 3, the coordinates of an arbitrary pixel in the output image DRs are given as a paired horizontal X coordinate and vertical Y coordinate with respect to the origin coordinates (0, 0). If the coordinates of the pixel of interest are (x, y) and the coordinates of the field center are ($x_C$, $y_C$), the distance L is calculated according to the following equation (1).

$$L = \sqrt{(x-X_C)^2 + (y-Y_C)^2} \ldots \quad (1)$$

Figure 4A:
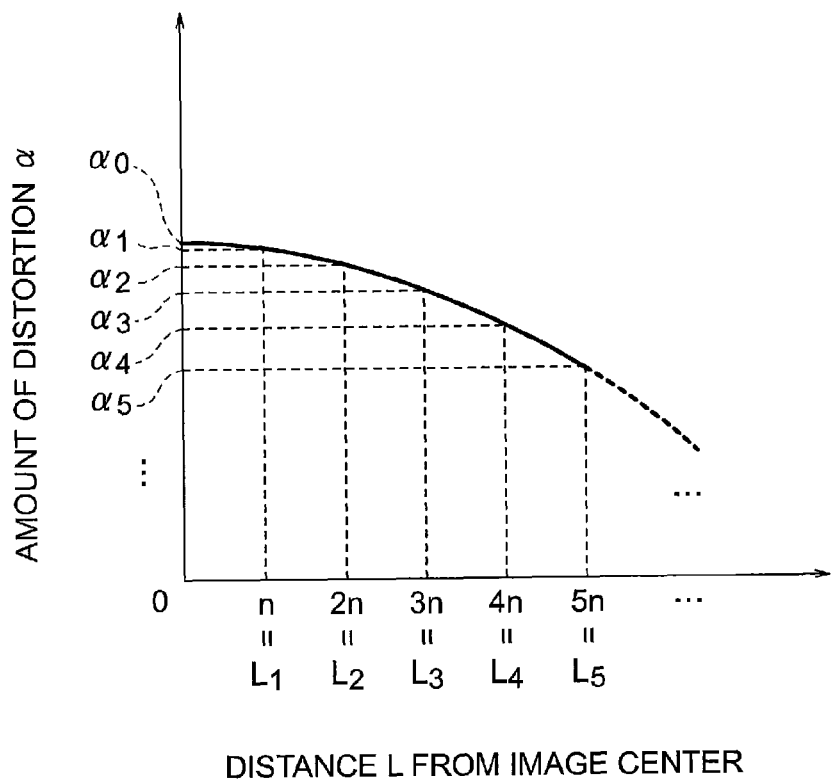
FIG. 4(A) is a graph showing an example of the relationship between amount of distortion α and distance L from the image center.

Next, the distortion correction processor 24 obtains the amount of distortion α corresponding to the calculated distance L as the amount of distortion of the pixel of interest. FIG. 4(A) is a graph showing an exemplary relationship between the amount of distortion α and the distance L. FIG. 4(A) shows an example in which the farther the distance is from the field center, the smaller the amount of distortion α becomes. As shown in FIG. 4(A), the amount of distortion α is given as discrete values $α_0$, $α_1$, $α_2$, $α_3$, . . . respectively corresponding to the distances $L_0$ (=0), $L_1$, $L_2$, $L_3$, . . . of discrete points spaced at intervals equal to a unit distance n. The amount of distortion α corresponding to an arbitrary point between mutually adjacent discrete points can be calculated by interpolation. When linear interpolation is used, for example, the amount of distortion α=α(k, k+1, Δ) corresponding to the distance L of an internal dividing point between distances $L_k$ and $L_{k+1}$ is given by the following equation (2).

$$\alpha(k, k+1, \Delta) = \frac{\alpha_k \cdot (n-\Delta) + \alpha_{k+1} \cdot \Delta}{n} \quad (2)$$

Figure 4B:
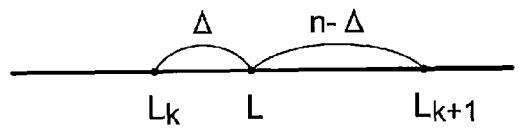
FIG. 4(B) is a diagram used in describing a method of calculating the amount of distortion by linear interpolation.

In the above equation (2), Δ is the distance between the point at distance L and the point at distance $L_k$, and n−Δ is the distance between the point at distance L and the point at distance $L_{k+1}$ (FIG. 4(B)). Instead of the above method, the amount of distortion α corresponding to an arbitrary point can also be calculated by use of an N-degree interpolation polynomial (where N is an integer equal to or greater than 2).

Next, the distortion correction processor 24 calculates the reference coordinates ($x_0$, $y_0$) of the pixel to be referenced in the noise-reduced image NRs in order to calculate the pixel value of the pixel of interest. Because of the distortion correction, there is a discrepancy between the coordinates (x, y) on the output image DRs in which distortion is corrected and the reference coordinates ($x_0$, $y_0$) in the noise-reduced image NRs that was actually captured. In this embodiment, distortion aberration is assumed to depend only on the distance (image height) from the field angle center of the imaging optics. The reference coordinates ($x_0$, $y_0$) are calculated by use of the amount of distortion α corresponding to the coordinates (x, y) according to the following equation (3).

$$\begin{cases} x_0 = \alpha \cdot (x - X_C) + X_C \\ y_0 = \alpha \cdot (y - Y_C) + Y_C \end{cases} \quad (3)$$

Figure 5:
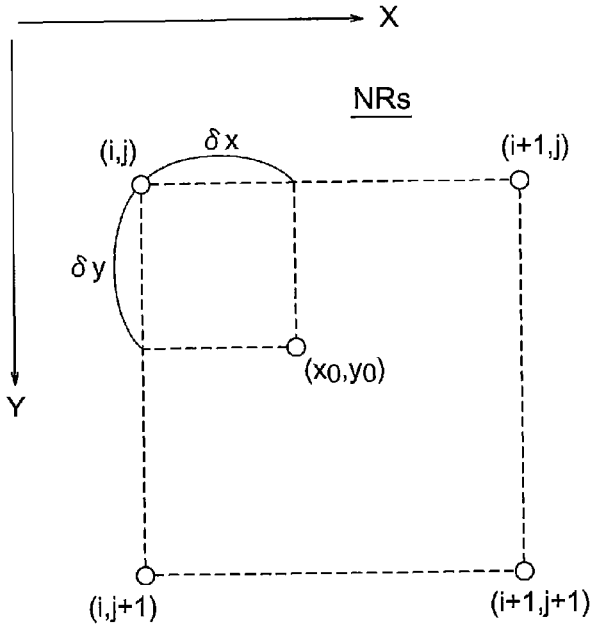
FIG. 5 is a diagram used in describing a method of interpolating the pixel value at the reference coordinates $(x_0, y_0)$ with a weighted average by linear interpolation.

The reference coordinate values $x_0$ and $y_0$ do not always match the coordinate values of a pixel present in the noise-reduced image NRs. Specifically, the reference coordinate values $x_0$ and $y_0$ are not always integer values. Accordingly, the distortion correction processor 24 can calculate the pixel value G(x, y) of the pixel of interest in the output image DRs by sampling the pixel value of the reference pixel or the pixel values of its neighboring pixels and performing an interpolation process using the sampled pixel values. FIG. 5 is a diagram that will be used in describing the method of interpolating the pixel value of the reference coordinates ($x_0$, $y_0$) by a weighted average linear interpolation method. As shown in FIG. 5, the pixel values at the coordinates (i, j), (i+1, j), (i, j+1), (i+1, j+1) of the pixels neighboring the reference coordinates ($x_0$, $y_0$) can be used to interpolate the pixel value at the reference coordinates ($x_0$, $y_0$), that is, the pixel value of the pixel of interest. It will be assumed that the reference coordinates ($x_0$, $y_0$) are offset from the upper left coordinates (i, j) horizontally by δx and vertically by δy. If the pixel value at arbitrary coordinates (p, q) in the noise-reduced image NRs is represented by g(p, q) and the pixel value of the pixel of interest in the output image DRs is represented by G(x, y), the pixel value G(x, y) of the pixel of interest is calculated by using the following equation (4).

$$G(x,y) = g(x_0, y_0) = g(i,j) \cdot (1-\delta x) \cdot (1-\delta y) + g(i+1,j) \cdot \delta x \cdot (1-\delta y) + g(i,j+1) \cdot (1-\delta x) \cdot \delta y + g(i+1,j+1) \cdot \delta x \cdot y \ldots \quad (4)$$

As described above, the distortion correction processor 24 can correct distortion in the noise-reduced image NRs by locally deforming (stretching or shrinking) the noise-reduced image NRs with a magnification factor responsive to the amount of distortion α. Here, if the distance of the pixel of interest from the field center in the noise-reduced image NRs is denoted H, the distance H indicates an amount corresponding to the actual image height, which is given by the product of the distance L corresponding to the ideal image height and the corresponding amount of distortion α (i.e., H=α×L). As mentioned above, this embodiment assumes that distortion aberration depends only on the distance (image height) from the field angle center of the imaging optics, so the distance H can be represented by a function H=f(L) with the distance L as an independent variable. Therefore, if the magnification of the local deformation (stretching or shrinking) for correcting distortion is denoted R, the magnification factor R can be expressed as the reciprocal of the first derivative of H with respect to L. The magnification factor R is then given by the following equation (5).

$$R = \left(\frac{dH}{dL}\right)^{-1} = \left(\frac{d(\alpha \cdot L)}{dL}\right)^{-1} \quad (5)$$

Here, R=1 means identical size; that is, no stretching or shrinking is performed. A value of R greater than 1 means that a local pixel region centered on the pixel of interest is stretched by the distortion correction process; a value of R less than 1 means that a local pixel region centered on the pixel of interest is shrunk by the distortion correction process.

The operation of the parameter calculation processor 22 will now be described.

Figure 6:
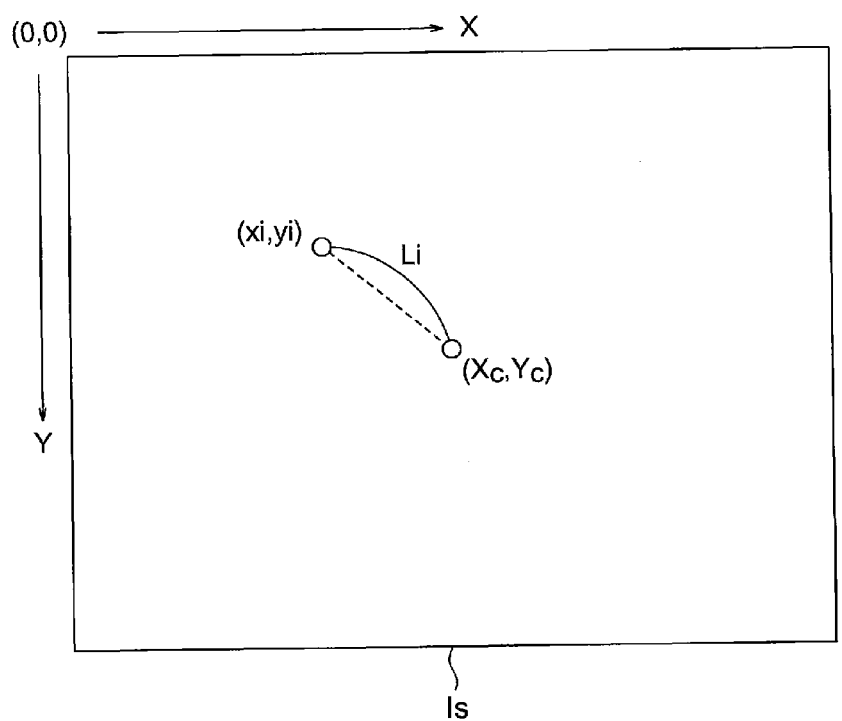
FIG. 6 is a diagram showing the relationship between the pixel of interest and the image center in an input image.

The parameter calculation processor 22 first calculates the distance Li between the pixel of interest and the field center of the input image Is, as shown in FIG. 6. If the coordinates of the pixel of interest are (xi, yi) and the coordinates of the field center are ($X_C$, $Y_C$), the distance Li can be calculated according to the following equation (6).

$$Li = \sqrt{(xi-X_C)^2 + (yi-Y_C)^2} \quad (6)$$

Next, the parameter calculation processor 22 calculates the magnification factor R on the basis of the calculated distance Li and also calculates the vector values s and t of the vector (s, t) representing the direction of application of the magnification factor R (the direction in which stretching or shrinking takes place).

The magnification factor R can also be represented by the following equation (7), which is similar to equation (5) above.

$$R = \left(\frac{dLi}{dL}\right)^{-1} = \left(\frac{d(\alpha \cdot L)}{dL}\right)^{-1} \quad (7)$$

Accordingly, if the distance Li can be given as a function Li=f(L), such as a polynomial function, using the distance L as an independent variable, the first derivative of that function can be used to calculate the magnification factor R. Alternatively, it is possible to calculate the magnification factor R by using an approximation to the above equation (7). When the amount of distortion α is given as discrete values $\alpha_0$, $\alpha_1$, $\alpha_2$, . . . as illustrated in FIG. 4, since the unit distance n is very small, when L=$L_k$ (=n×k), the following approximation can be derived from the above equation (7).

$$R = \left(\frac{f(L+dL) - f(L)}{dl}\right)^{-1} \cong \left(\frac{f(L_{k+1}) - f(L_k)}{n}\right)^{-1} = \left(\frac{\alpha_{k+1} \cdot (k+1)n - \alpha_k \cdot kn}{n}\right)^{-1}$$

Hence the following approximation (7a) can be derived.

$$R \cong \frac{1}{\alpha_{k+1} \cdot (k+1) - \alpha_k \cdot k} \quad (7a)$$

Figure 7:
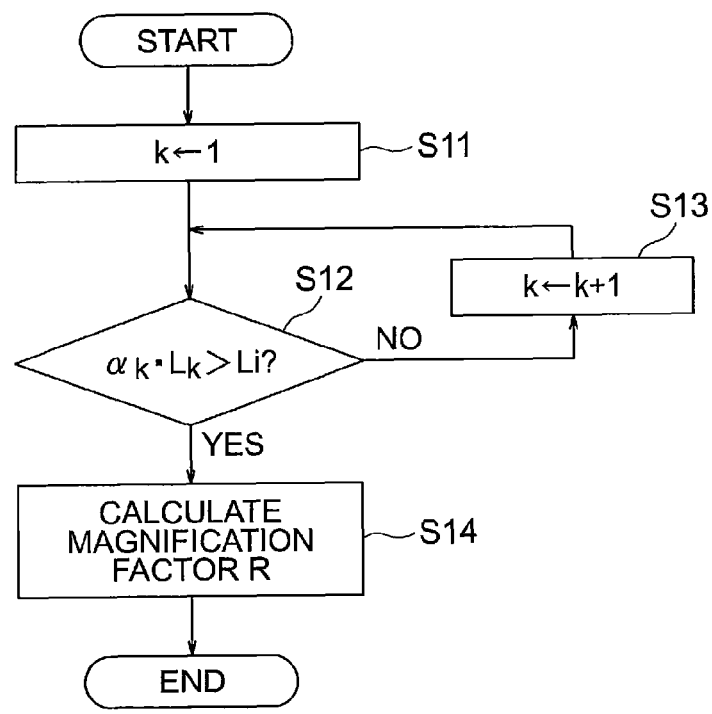
FIG. 7 is a flowchart schematically illustrating a processing procedure carried out by the parameter calculation processor. center in an input image.

FIG. 7 is a flowchart illustrating the procedure for calculating the magnification factor R by using this approximation (7a). As shown in FIG. 7, the parameter calculation processor 22 first sets a variable k to '1' (step S11), and determines whether or not the distance Li is less than the distance $\alpha_k \cdot L_k$ before distortion is corrected (step S12). If the distance Li is not less than the distance $\alpha_k \cdot L_k$ (No in step S12), the parameter calculation processor 22 increments the variable k by 1 (step S13), and then returns the processing to step S12. If the distance Li is less than the distance $\alpha_k \cdot L_k$ (Yes in step S12), the first distance $L_k$ that satisfies the condition Li<$\alpha_k \cdot L_k$ is detected. The magnification factor R is then calculated according to the above equation (7a) (step S14).

The parameter calculation processor 22 can also calculate the vector values s and t of the vector (s, t) representing the direction of application of the magnification factor R (the direction in which stretching or shrinking takes place).

$$\begin{cases} s = (xi - X_C)/Li \\ t = (yi - Y_C)/Li \end{cases} \quad (8)$$

The order of calculation of the magnification factor R and vector values s and t may be reversed. The parameter calculation processor 22 supplies the calculated magnification factor R and vector (s, t) to the noise suppression processor 23.

Figure 8:
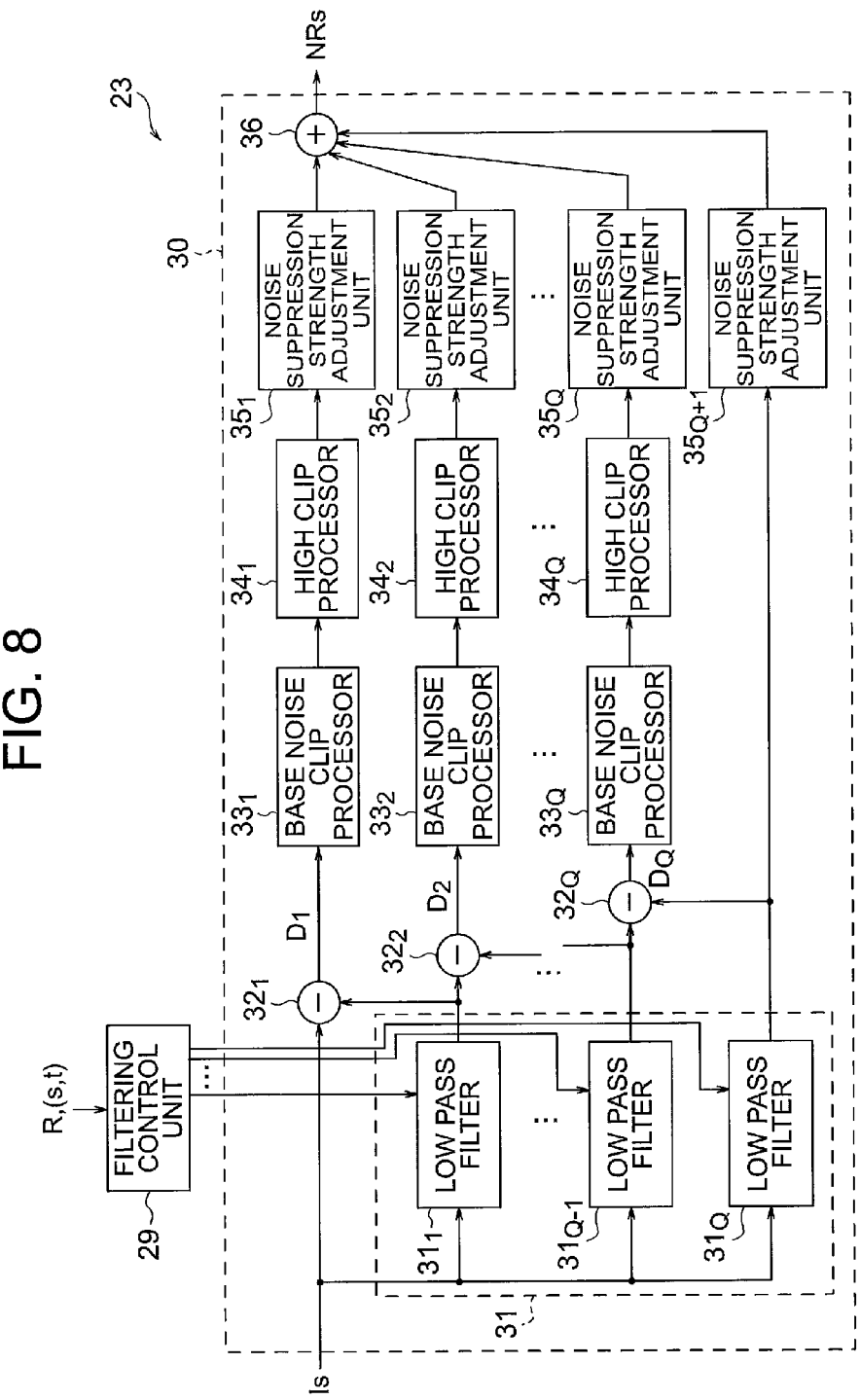
FIG. 8 is a functional block diagram showing the basic configuration of the noise suppression processor in the first embodiment.

Next, the operation of the noise suppression processor 23 will be described. FIG. 8 is a functional block diagram schematically showing the basic configuration of the noise suppression processor 23. As shown in FIG. 8, the noise suppression processor 23 includes a filtering control unit 29 and a noise suppression unit 30.

The noise suppression unit 30 includes a spatial filter unit 31 consisting of low pass filters $31_1$ to $31_Q$ (where Q is an integer equal to or greater than 3), difference calculators $32_1$ to $32_Q$, base noise clip processors $33_1$ to $33_Q$, high clip processors $34_1$ to $34_Q$, and noise suppression strength adjustment units $35_1$ to $35_{Q+1}$.

Each of the low pass filters $31_1$ to $31_Q$ executes spatial filtering on multiple pixels in a reference range (sampling range) including the pixel of interest in the input image Is. In this embodiment, smoothing spatial filtering (low pass filtering) is executed. The low pass filters $31_1$ to $31_Q$ have standard set ranges with mutually differing sizes; the filtering control unit 29 can set variable reference ranges by using the standard set ranges as standards.

Figure 9A:
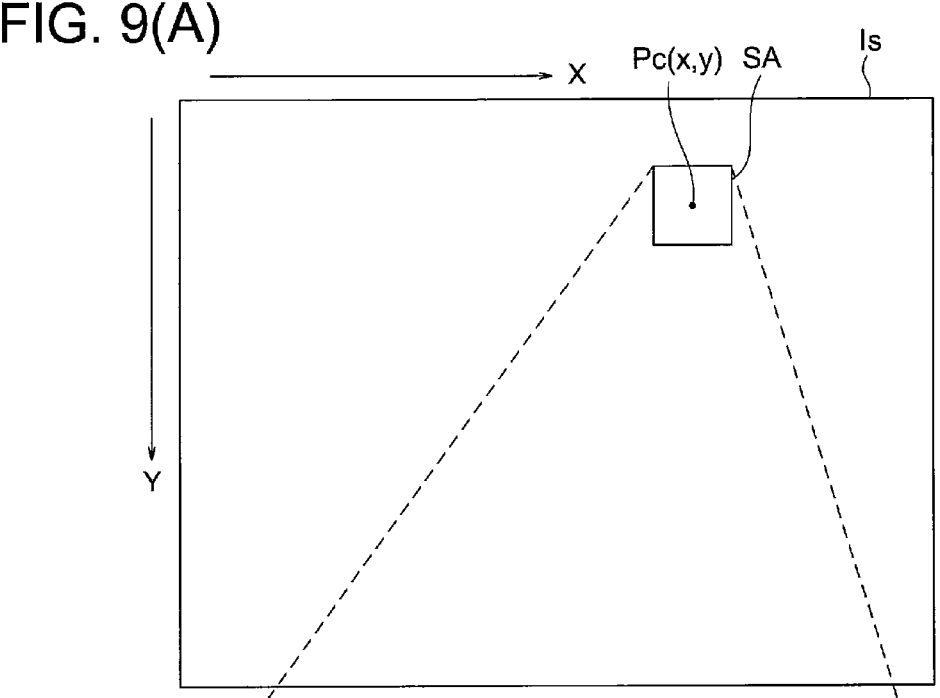
FIGS. 9(A) and 9(B) are diagrams showing an example of the reference range SA.
Figure 9B:
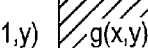

FIGS. 9(A) and 9(B) are diagrams showing a standard reference range SA. As shown in FIGS. 9(A) and 9(B), the standard reference range SA is a matrix array of (2M+1)× (2N+1) pixels centered on a pixel of interest Pc(x, y) at coordinates (x, y). Here, N and M are integers equal to or greater than 1. Since the low pass filters $31_1$ to $31_Q$ have standard reference ranges of mutually differing sizes, the values of N and M differ for each low pass filter. Each of the low pass filters $31_1$ to $31_Q$ multiplies the pixel values g(x−i, y−j) in the standard reference range SA by weighting coefficients (filter coefficients) K(i, j) and adds the products g(x−i, y−j)×K(i, j) obtained for all the pixels in the standard reference range SA, thereby calculating the pixel value D(x, y) in the filtered image. Specifically, the pixel value D(x, y) in the filtered image corresponding to the pixel of interest Pc(x, y) can be calculated according to the following equation (9).

$$D(x, y) = \sum_{i=-M}^{+M} \sum_{j=-N}^{+N} g(x-i, y-j) \cdot K(i, j) \quad (9)$$

Here, the values of the weighting coefficients K(i, j) are all positive values and the sum of the weighting coefficients K(i, j) is 1. The weighting coefficient K(0, 0) by which the pixel value g(x, y) of the pixel of interest Pc(x, y) is multiplied is selected so as to have a greater value than the other weighting coefficients.

[0042]

The filtering control unit 29 can change the reference ranges for the low pass filters $31_1$ to $31_Q$ by changing the settings of the weighting coefficients K(i, j). For example, if the values of the weighting coefficients K(i, j) are all non-zero, it is possible to make the reference range narrower than the standard reference range SA by setting the values of some of the weighting coefficients K(i, j) to zero. The reference ranges of the low pass filters $31_1$ to $31_Q$ have mutually differing sizes. In this embodiment, the reference ranges of the low pass filters $31_1$ to $31_Q$ are set so that their areas increase as the filter number q of the low pass filter $31_q$ increases. In other words, in terms of two arbitrary low pass filters $31_r$ and $31_s$ (r <s), the reference range of the low pass filter $31_s$ with the larger filter number is larger than the reference range of the low pass filter $31_r$ with the smaller filter number. Accordingly, the spatial frequency components of the outputs (filtered images) of the low pass filters $31_1$ to $31_Q$ are not necessarily identical.

The difference calculator $32_1$ removes the spatial frequency components of the filtered image output by low pass filter $31_1$ from the input image Is, thereby generating a difference image $D_1$, and supplies the difference image $D_1$ to the base noise clip processor $33_1$. The other difference calculators $32_2$ to $31_Q$ respectively remove the spatial frequency components of the filtered images output from low pass filters $31_2$ to $31_Q$ from the filtered images output from low pass filters $31_1$ to $31_{Q-1}$, thereby generating difference images $D_2$ to $D_Q$. The difference images $D_2$ to $D_Q$ are respectively supplied to the base noise clip processors $33_2$ to $33_Q$. Specifically, the m-th difference calculator $32_m$ (where m is a positive integer equal to or greater than 2 and equal to or less than Q) removes the spatial frequency components of the filtered image output by the m-th low pass filter $31_m$ from the filtered image output by the (m−1)-th low pass filter $31_{m-1}$, thereby generating a difference image $D_m$, and supplies the difference image $D_m$ to the m-th base noise clip processor $33_m$.

Figure 10:
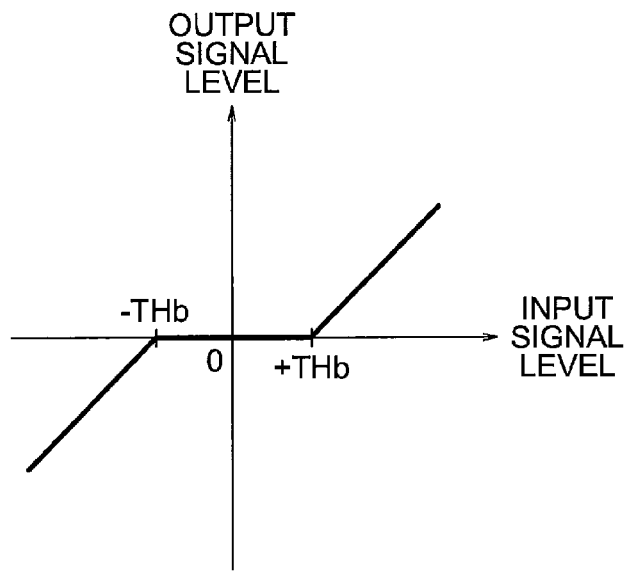
FIG. 10 is a drawing showing an exemplary input-output characteristic of the base noise clip processor in the first embodiment.

Each of the base noise clip processors $33_1$ to $33_Q$ has a clip function that converts input signal levels in an amplitude range equal to or lower than a positive threshold value THb to an output signal level with an amplitude lower than the threshold value THb. This enables low-amplitude signal components in the signals separated into frequency bands by the low pass filters $31_1$ to $31_Q$ and difference calculators $32_1$ to $32_Q$ to be rejected to suppress noise components. FIG. 10 is a drawing showing an exemplary input-output characteristic of the base noise clip processors $31_1$ to $31_Q$. As shown in FIG. 10, noise components are suppressed by converting the input signal level in a low-amplitude range in which the input signal amplitude is equal to the threshold value THb or lower (input signal levels in the signal level range from −THb to +THb) to zero. The threshold value THb can be set individually for each of the base noise clip processors $31_1$ to $31_Q$.

Figure 11:
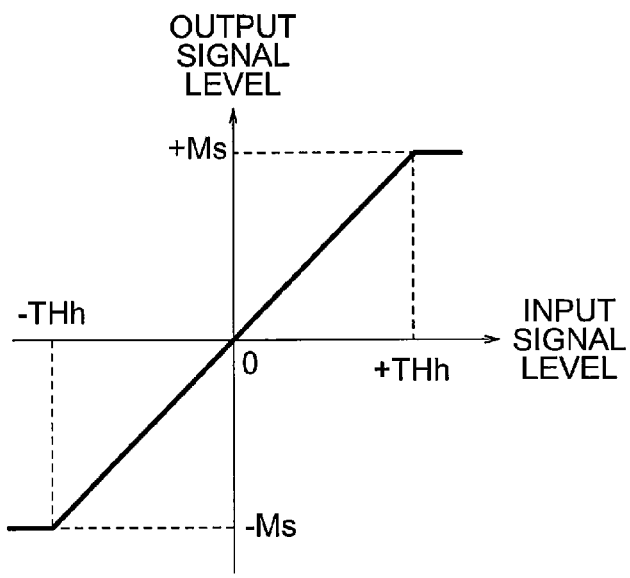
FIG. 11 is a drawing showing an exemplary input-output characteristic of the high clip processor in the first embodiment.

The high clip processors $34_1$ to $34_Q$ respectively receive the outputs of the base noise clip processors $33_1$ to $33_Q$ as inputs, and have a clip processing function that converts input signal levels in an amplitude range equal to or greater than a threshold value THh which is greater than the threshold value THb to an output signal level with a constant amplitude. By clipping signals with a certain amplitude or higher, high intensity noise can be suppressed in a certain frequency band. FIG. 11 is a drawing showing an exemplary input-output characteristic of the high clip processors $34_1$ to $34_Q$. As shown in FIG. 11, the input signal levels in a high-amplitude range, in which the input signal amplitude is equal to the threshold value THh or greater, are individually converted to a constant output signal level. Specifically, input signal levels in the range of signal levels equal to or greater than the threshold value +THh are converted to a constant output signal level (=+Ms), and input signal levels in the range of signal levels equal to or lower than −THh are converted to a constant output signal level (=−Ms). A separate threshold value THh can be set for each of the high clip processors $34_1$ to $34_Q$.

Noise suppression strength adjustment units $35_1$ to $35_Q$ respectively receive the outputs of the high clip processors $33_1$ to $33_Q$ as inputs and have the function of individually multiplying the outputs of the high clip processors $33_1$ to $33_Q$ by a correction coefficient. Noise suppression strength adjustment unit $35_{Q+1}$ has the function of multiplying the output of low pass filter $31_Q$ by a correction coefficient. By separately applying a correction coefficient to the signals separated into frequency bands by the low pass filters $31_1$ to $31_Q$ and difference calculators $32_1$ to $32_Q$ in this way, very strong noise suppression can be performed. An adder 36 adds the (Q+1) outputs of the noise suppression strength adjustment units $35_1$ to $35_Q$, thereby generating the noise-reduced image NRs.

The filtering control unit 29 has the function of, as the above magnification factor R increases, separately narrowing the reference ranges (sampling ranges) of the low pass filters $31_1$ to $31_Q$ by narrowing them in the direction parallel to the direction of application (s, t) of the magnification range R. By deforming (stretching or shrinking) the pixel range corresponding to the reference range in the noise-reduced image NRs, the distortion correction processor 24 in FIG. 2 can correct distortion within that pixel range. The filtering control unit 29 sets the reference range of each of the low pass filters $31_1$ to $31_Q$ so that the size of the pixel range after the deformation is substantially the same as the size of the standard reference range. This is done to equalize the noise characteristics after distortion correction processing.

The filtering control unit 29 has a lookup table indicating a correspondence relationship between sets of values of the noise suppression parameters R, s, and t and the candidate reference ranges of the low pass filters $31_1$ to $31_Q$, which can be referenced to dynamically select a reference range corresponding to the current values of the noise suppression parameters R, s, and t, from among multiple candidate reference ranges.

Figure 12:
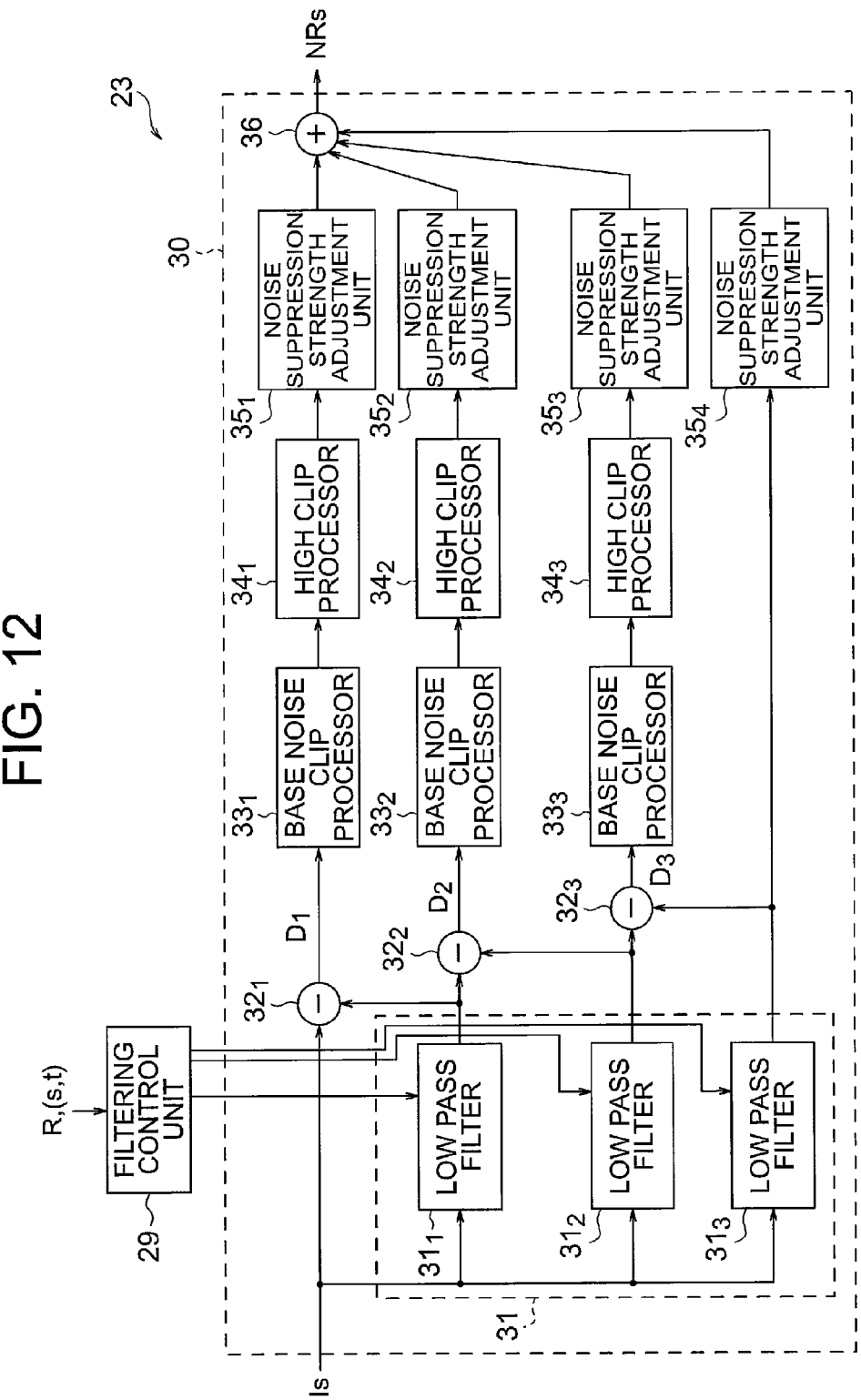
FIG. 12 is a functional block diagram schematically showing an example of the noise suppression processor in the first embodiment.
Figure 15A:
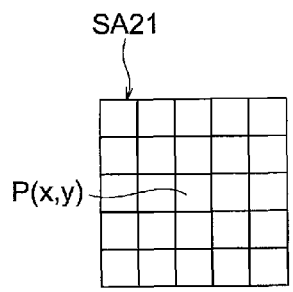
FIGS. 15(A) to 15(I) are drawings showing candidate reference ranges to be applied in a low pass filter.
Figure 15B:
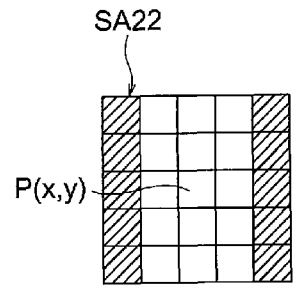
Figure 15C:
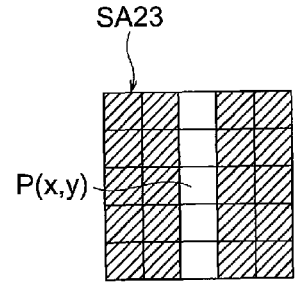
Figure 15D:
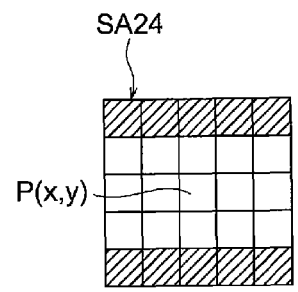
Figure 15E:
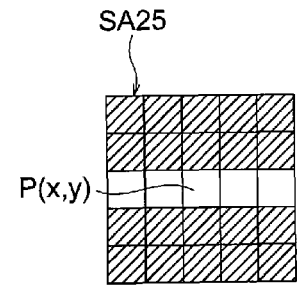
Figure 15F:
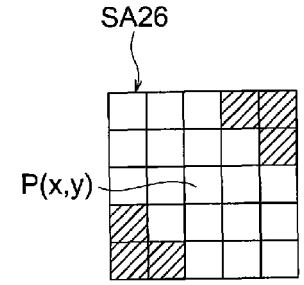
Figure 15G:
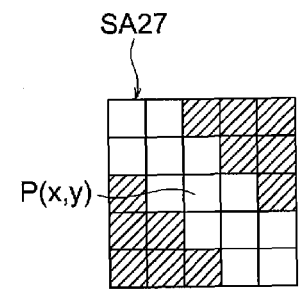
Figure 15H:
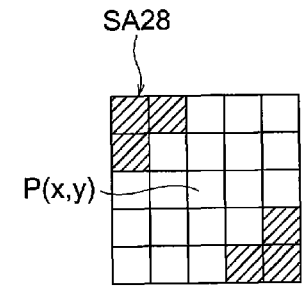
Figure 15I:
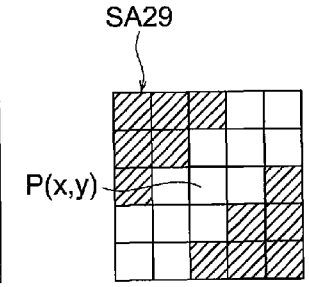
Figure 16A:
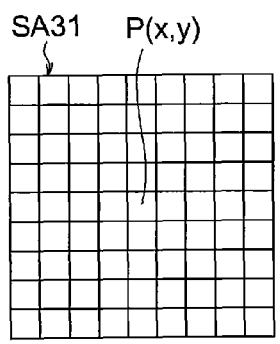
FIGS. 16(A) to 16(I) are drawings showing candidate reference ranges to be applied in a low pass filter.
Figure 16B:
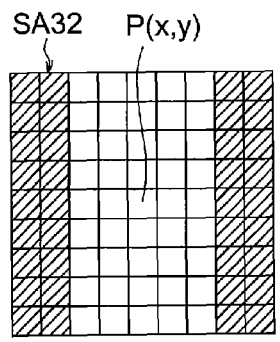
Figure 16C:
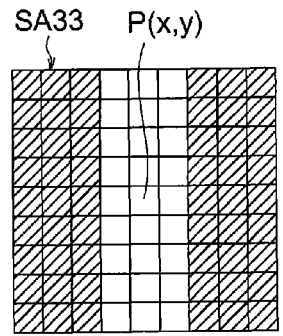
Figure 16D:
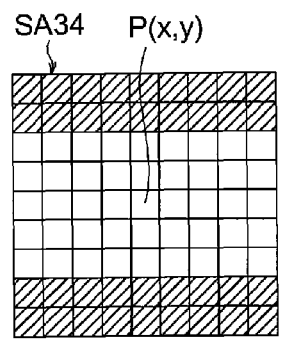
Figure 16E:
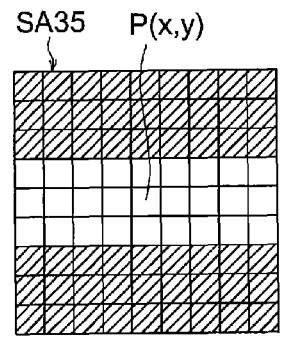
Figure 16F:
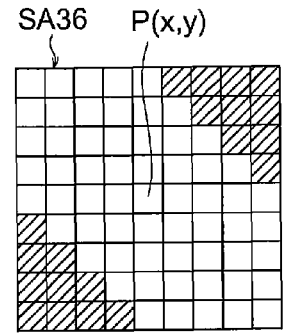
Figure 16G:
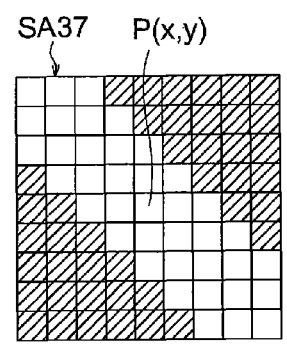
Figure 16H:
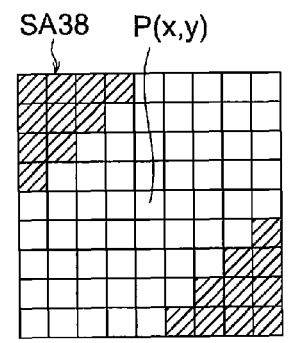
Figure 16I:
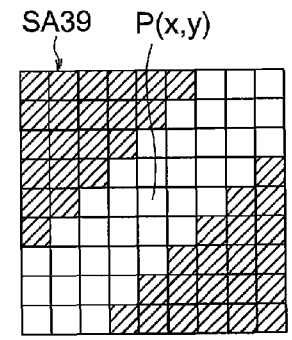

The configuration of the noise suppression processor 23 when the number of low pass filters $31_1$ to $31_Q$ is three will now be described. FIG. 12 is a drawing schematically showing the configuration of a noise suppression processor 23 including a spatial filter unit 31 consisting of three low pass filters $31_1$ to $31_3$.

FIGS. 13(A) to 13(E) are drawings showing the (3×3)-pixel candidate reference ranges SA11, SA12, SA13, SA14, SA15 to be used for low pass filter $31_1$ in FIG. 12. Candidate reference range SA11 is the standard reference range of low pass filter $31_1$, and is the reference range selected when the distortion is zero. In FIGS. 13(A) to 13(E), hatching denotes pixel regions removed from the reference range with respect to the pixel of interest P(x, y). FIGS. 14(A) to 14(C) are drawings showing exemplary weighting coefficients (filter coefficients) to be used for candidate reference ranges SA11, SA12, and SA13. Next, FIGS. 15(A) to 15(I) are drawings showing the candidate reference ranges SA21, SA22, SA23, SA24, SA25, SA26, SA27, SA28, SA29 to be used for low pass filter $31_2$ in FIG. 12, and FIGS. 16(A) to 16(I) are drawings showing the candidate reference ranges SA31, SA32, SA33, SA34, SA35, SA36, SA37, SA38, SA39 to be used for low pass filter $31_3$ in FIG. 12. Here, candidate reference range SA21 is the standard reference range of low pass filter $31_2$ and candidate reference range SA31 is the standard reference range of low pass filter $31_3$. Candidate reference ranges SA21 and SA31 are selected when the distortion is zero. In FIGS. 14(A) to 14(I) and FIGS. 15(A) to 15(I), hatching denotes pixel regions removed from the reference range with respect to the pixel of interest P(x, y).

Figure 19:
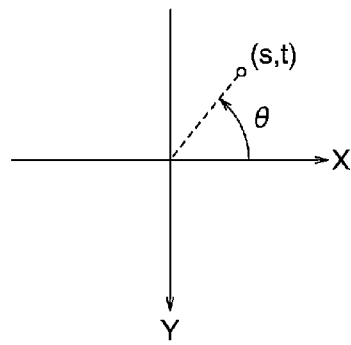
FIG. 19 is a diagram showing the relationship between direction parameters s and t and angle θ.

FIG. 17 is a drawing showing an exemplary lookup table provided for the selection of the reference range to be used for low pass filter $31_1$ in FIG. 12. FIG. 18 is an exemplary lookup table provided for the selection of the reference range for use with both low pass filters $31_2$ and $31_3$ in FIG. 12. Here, as shown in FIG. 19, θ has a value expressed in the range from −180° to 180° when vector values s and t are plotted in an orthogonal x-y coordinate system, where the angle of the coordinates (s, t) with respect to the origin is 0° in the positive x-axis direction and counterclockwise angles are positive. The lookup tables in FIGS. 17 and 18 include the reference characters for the candidate reference ranges in FIGS. 13(S) to 13(E), FIGS. 15(A) to 15(I), and FIGS. 16(A) to 16(I).

The filtering control unit 29 in FIG. 12 can refer to the lookup tables in FIGS. 17 and 18 to dynamically select, from among multiple candidate reference ranges, a reference range corresponding to the current set of values of the noise suppression parameters R, s, and t. It can be seen that, as shown in the lookup tables in FIGS. 17 and 18, the respective reference ranges (sampling ranges) of low pass filters $31_1$ to $31_3$ are narrowed stepwise as the magnification factor R increases. As shown in FIG. 17, for example, in the range −180°<θ<−157.5°, if R≤2.0, application range SA11 is selected as the range applied to low pass filter $31_1$, and if R>2.0, application range SA12, which is narrower than application range SA11, is selected. It can also be seen that as the magnification range R increases, the reference ranges of low pass filters $31_1$ to $31_3$ narrow stepwise in the direction parallel to the direction of application (s, t) of the magnification factor R. For example, as shown in FIG. 18, within the range −22.5°<θ<+22.5°, the reference range of low pass filter $31_2$ is switched from the standard reference range SA21 to candidate reference range SA22 or from candidate reference range SA22 to candidate reference range SA23, narrowing stepwise in the θ=0° angular direction (the ±X-axis direction).

Next, the effects of the first embodiment will be described.

As described above, in the image processing device 21 in this embodiment, the filtering control unit 29 dynamically changes the size of the reference ranges (sampling ranges) of the spatial filter unit 31 responsive to the magnification factor R, narrowing the reference ranges as the magnification factor R increases. This enables the strength of noise suppression processing to be locally increased in parts of the image with a high magnification factor R, which makes noise tend to stand out. Accordingly, even when distortion correction processing is performed in the distortion correction processor 24 in FIG. 2, it is possible to suppress image quality degradation caused by the stretching, during the distortion correction process, of noise occurring in a distorted input image Is. In addition, the filtering control unit 29 mainly narrows the reference ranges in the direction parallel to the direction of application of the magnification factor R (the direction of the vector (s, t)), so it is possible to prevent the noise components from being stretched in a particular direction, which would produce visually unnatural characteristics.

When the distortion correction processor 24 in FIG. 2 deforms (stretches or shrinks) a pixel range corresponding to a reference range in the noise-reduced image NRs to correct distortion in the pixel range, regardless of the position of the pixel of interest, the filtering control unit 29 can set the reference range so that the size of the pixel range after deformation is substantially equal to the size of the standard reference range. In particular, the filtering control unit 29 narrows the width of the reference range so as to produce a magnification factor equal to the reciprocal of the magnification factor R in the direction parallel to the deformation direction in the distortion correction processor 24. This enables effective suppression of the generation of unnatural noise due to pixel-to-pixel differences in the direction of deformation with magnification factor R in the distortion correction processing. Accordingly it becomes possible to produce a uniform noise characteristic after distortion correction processing.

Second Embodiment

A second embodiment of the invention will now be described. The configuration of the image processing device in this embodiment is the same as the configuration of the image processing device 21 in the first embodiment except for part of the operation of the filtering control unit 29 in FIG. 8. Therefore, the second embodiment will be described with reference to FIGS. 2 and 8. In the first embodiment, the filtering control unit 29 dynamically determines the reference ranges of the low pass filters $31_1$ to $31_Q$ by referring to lookup tables, but the filtering control unit 29 in the second embodiment receives the magnification factor R and direction parameters s and t as inputs, and calculates the pixel positions defining the reference ranges of the low pass filters $31_1$ to $31_Q$ by computational processing.

Figure 20:
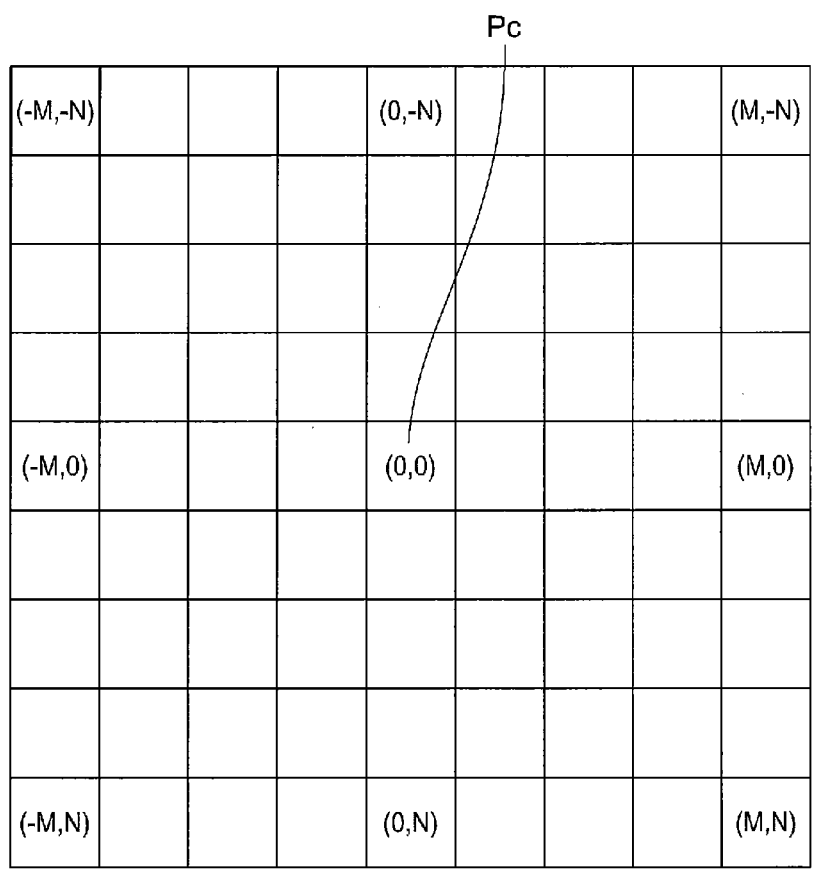
FIG. 20 is a drawing schematically showing an exemplary reference range in a second embodiment according to the invention.

FIG. 20 is a drawing schematically showing an example of the standard reference range SA in this embodiment. The standard reference range SA is a (2M+1)×(2N+1)-pixel matrix array centered on the pixel of interest Pc. Here, M and N are integers equal to or greater than 1. As in the first embodiment, the low pass filters $31_1$ to $31_Q$ have mutually differing standard reference ranges, so the values of M and N differ for each low pass filter. Local coordinates of the pixels are shown in FIG. 20. The coordinates of the pixel of interest Pc are (0, 0).

The filtering control unit 29 converts the coordinates (a, b) (where a is an integer in the range from −M to +M, and b is an integer in the range from −N to +N) of all the pixels in the standard reference range for each of the low pass filters $31_1$ to $31_Q$ to coordinates (p, q) according to the following conversion equation (10).

$$\begin{pmatrix} p \\ q \end{pmatrix} = R(-\theta) \cdot S(1/R) \cdot R(\theta) \cdot \begin{pmatrix} a \\ b \end{pmatrix} \qquad (10)$$

$$= \begin{pmatrix} s, & -t \\ t, & s \end{pmatrix} \begin{pmatrix} 1/R, & 0 \\ 0, & 1 \end{pmatrix} \begin{pmatrix} s, & t \\ -t, & s \end{pmatrix} \begin{pmatrix} a \\ b \end{pmatrix}$$

In equation (10), R(θ) is a rotation matrix that rotates the coordinates so that the direction of stretching or shrinking matches the X-axis; S(1/R) is a matrix for changing the coordinate positions in the X-axis direction by the reciprocal ratio 1/R of the magnification 1/R; R(−θ) is the inverse matrix of R(θ).

By rearranging the above equation (10), the following equation (10a) can be obtained.

$$\begin{pmatrix} p \\ q \end{pmatrix} = \begin{pmatrix} \dfrac{s^2 \cdot a + s \cdot t \cdot b}{R} + (t^2 \cdot a - s \cdot t \cdot b) \\ \dfrac{s \cdot t \cdot a + t^2 \cdot b}{R} + (-s \cdot t \cdot a + s^2 \cdot b) \end{pmatrix} \qquad (10a)$$

The filtering control unit 29 specifies a range defined by the set {(p, q)} of coordinates calculated by use of the above equation (10a) as the reference range. This enables the filtering control unit 29 to dynamically change the size of the reference range (sampling range) of the spatial filter unit 31 responsive to the magnification factor R and direction parameters s and t and narrow the reference range as the magnification factor R increases.

The filtering control unit 29 can narrow the reference range in the direction parallel to the direction of application of the magnification factor R (the direction of the vector (s, t)) without deforming the reference range in the direction orthogonal to the deformation direction in the distortion correction processor 24. Furthermore, for each of the low pass filters $31_1$ to $31_Q$, the filtering control unit 29 can define the reference range that corresponds to the reference range in the noise-reduced image NRs so that when the distortion correction processor 24 in FIG. 2 corrects distortion in the pixel range by deforming (stretching or shrinking) the pixel range, the size of the pixel range after the deformation is substantially equal to the size of the standard reference range, regardless of the position of the pixel of interest.

Accordingly, like the first embodiment, the second embodiment can mitigate the image quality degradation that occurs when noise superimposed on an image with distortion is stretched by distortion correction processing.

Since the reference range is determined dynamically by use of a conversion equation (10a), an additional advantage is that there is no need to prepare data for lookup tables as in the first embodiment.

Third Embodiment

Figure 21:
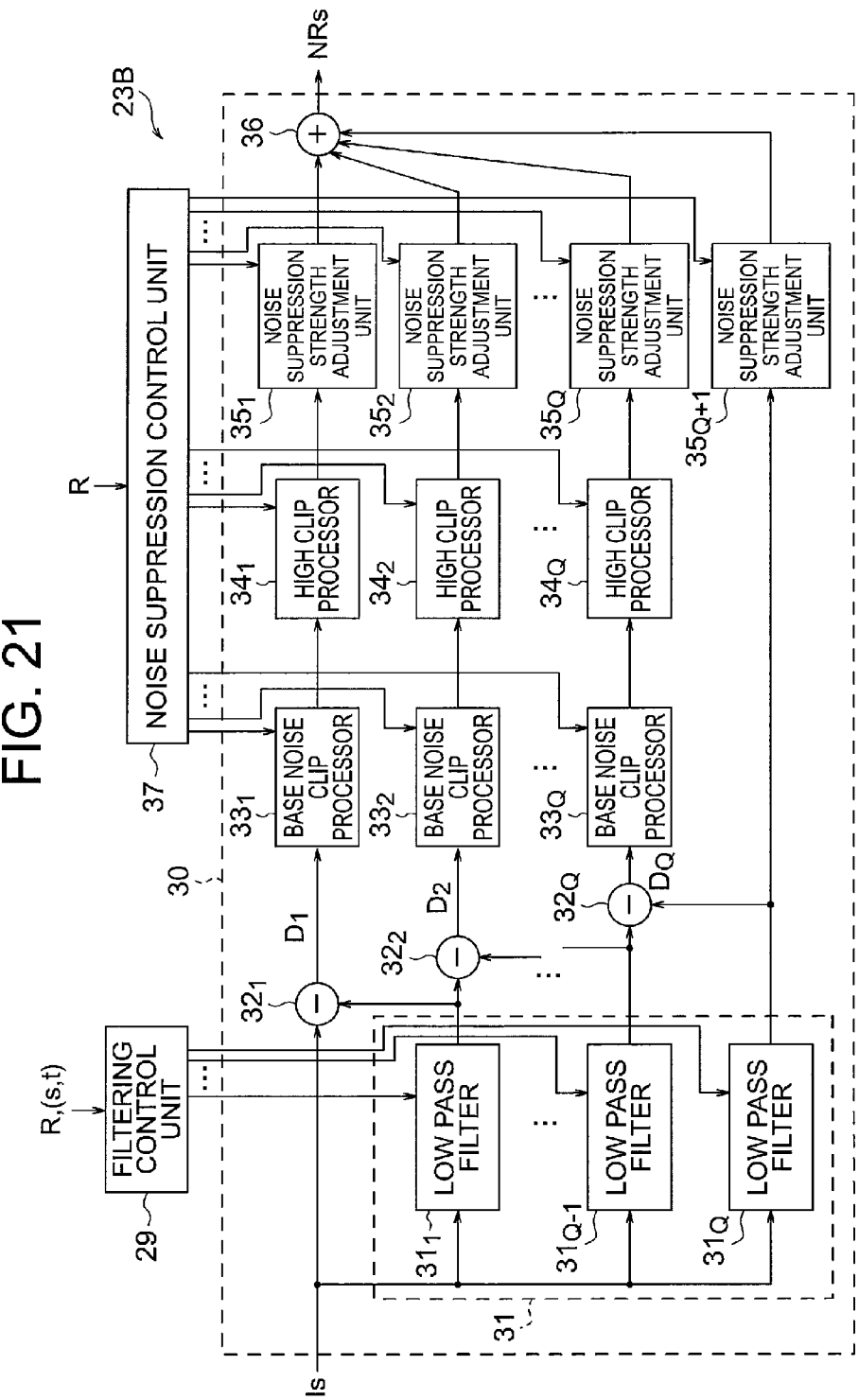
FIG. 21 is a diagram schematically showing the configuration of the noise suppression processor in a third embodiment of the invention.

Next, a third embodiment of the invention will be described. FIG. 21 is a drawing schematically showing the configuration of the noise suppression processor 23B in the third embodiment. The configuration of the image processing device in this embodiment is the same as the configuration of the image processing device 21 in the first embodiment, except for the configuration of the noise suppression processor 23B.

As shown in FIG. 21, the noise suppression processor 23B includes a filtering control unit 29 and noise suppression unit 30 like those in the noise suppression processor 23 in the first embodiment. The noise suppression processor 23B also has a noise suppression control unit 37. The noise suppression control unit 37 has the functions of dynamically changing the threshold values THb and THh in the base noise clip processors $33_1$ to $33_Q$ and high clip processors $34_1$ to $34_Q$ in accordance with the magnification factor R and dynamically changing the correction coefficients in the noise suppression strength adjustment units $35_1$ to $34_{Q+1}$.

FIG. 22 is a drawing representing a lookup table showing the correspondence between the magnification factor R and the sets of base noise clip threshold values THb, high clip threshold values THh, and correction coefficients when Q=3. The reference numerals of the associated base noise clip processors $33_1$ to $33_3$, high clip processors $34_1$ to $34_3$, and noise suppression strength adjustment units $35_1$ to $35_4$ are indicated in FIG. 22. The noise suppression control unit 37 can refer to the lookup table in FIG. 22 to obtain the base noise clip threshold values THb, high clip threshold values THh, and correction coefficients corresponding to the current value of the magnification factor R. According to FIG. 22, the base clip threshold value THb for each of the base noise clip processors $33_1$, $33_2$, $33_3$ increases stepwise as the magnification factor R increases. The high clip threshold value THh for each of the high clip processors $34_1$, $34_2$, $34_3$ decreases stepwise as the magnification factor R increases. The correction coefficients for noise suppression strength adjustment units $35_1$, $35_2$, $35_3$ decrease stepwise as the magnification factor R increases, but the correction coefficient for noise suppression strength adjustment unit $35_4$ stays at a constant value (=1.0) regardless of the value of the magnification factor R.

As described above, the third embodiment changes the noise suppression processing parameters responsive to the current value of the magnification factor R, thereby locally increasing the strength of noise suppression processing in parts of the image with a high magnification factor R, which makes noise tend to stand out, and can thereby improve the image quality of the output image DRs after distortion correction processing.

Fourth Embodiment

Figure 23:
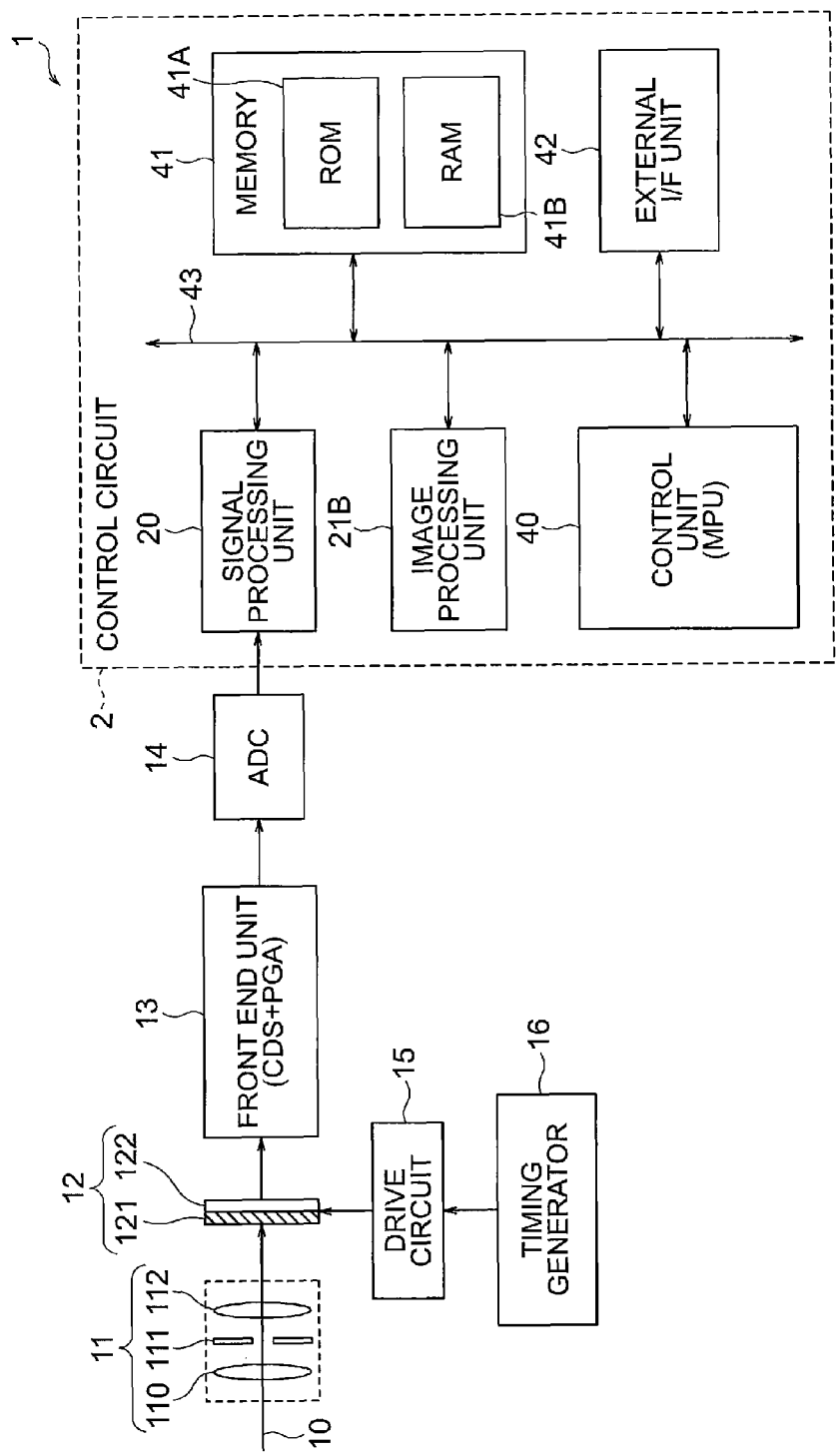
FIG. 23 is a block diagram showing the schematic configuration of an image processing device in a fourth embodiment of the invention.

A fourth embodiment will now be described. FIG. 23 is a block diagram showing the schematic configuration of an image capturing device 1 in the fourth embodiment. As shown in FIG. 23, the image capturing device 1 includes imaging optics 11 (a lens mechanism), a CCD image sensor 12, a front end unit 13, an A/D converter (ADC) 14, and a control circuit 2. The control circuit 2 has a signal processing unit 20, an image processing unit 21B, a control unit 40, a memory 41, and an external interface unit (external I/F unit) 42. These processing blocks 20, 21B, 40, 41, and 42 are interconnected through a bus 43. The control unit 40 is an MPU (Micro Processing Unit) for controlling the overall operation of the control circuit 2. The image processing unit 21B has the same configuration as any one of the image processing devices in the first to third embodiments.

The imaging optics 11 include a front lens 110, an aperture stop 111, and a rear lens 112. The CCD image sensor 12 is a single CCD solid state imaging element having a single color filter array 121 and a single CCD element 122. The color filter array 121 may be any array of N types of color filters transmitting light of colors in N mutually differing wavelength regions, arranged periodically in a plane (N being a positive integer equal to or greater than 2). In this embodiment, a Bayer array of primary colors can be used as the color filter arrangement of the color filter array 121, but this is not a limitation; a Bayer array of complementary colors may be used instead. In place of the CCD image sensor, a CMOS image sensor or another type of solid state imaging element may be used.

A timing generator 16 generates a driving timing signal and supplies it to a drive circuit 15. Responsive to the driving timing signal output from the timing generator 16, the drive circuit 15 generates drive signals for driving the CCD image sensor 12. The CCD image sensor 12 performs photoelectric conversion and charge transfer according to the driving signals.

The imaging optics 11 focus an optical image of a subject onto the image plane of the CCD image sensor 12. An image signal obtained by photoelectric conversion in the CCD image sensor 12 is transferred to the front end unit (analog processor) 13. The front end unit 13 executes a correlated double sampling (CDS) process and programmable gain amplification (PGA) and outputs the resulting analog signal to the ADC 14. Here, the CDS process eliminates unwanted components such as noise from the imaging signal output from the CCD image sensor 12. The ADC 14 converts the output signal from the front end unit 13 to a digital signal, and supplies the digital signal to the signal processing unit 20 in the control circuit 2.

The signal processing unit 20 outputs to the bus 43 a video signal obtained by carrying out color synchronization processing, gradation correction processing, noise reduction processing, contour correction processing, white balance adjustment processing, signal amplitude adjustment processing, color correction processing, and so on. Under the control of the control unit 40, the bus 43 transfers the video signal to a RAM (Random Access Memory) 41B in the memory 41. By reading the video signal from the RAM 41B, the image processing unit 21B can execute the spatial filtering, clip processing, and noise suppression strength adjustment processing described above.

Some or all of the functions of the image processing unit 21B may be implemented either in hardware or by a computer program executed by a microprocessor. For example, the microprocessor-equipped MPU 40 can implement the functions of the image processing unit 21B by loading and executing a computer program from a ROM (Read Only Memory) 41A, which is a nonvolatile memory.

Variations of the First to Fourth Embodiments

Various illustrative embodiments of the invention have been described above with reference to the drawings, but various embodiments other than the above may be employed.

For example, lookup table circuits may be used in place of the base noise clip processors $33_1$ to $33_Q$ and high clip processors $34_1$ to $34_Q$.

In the first to third embodiments the amount of distortion α is given as a value corresponding to a distance L, as shown in FIG. 4, but alternatively, it may be given as a value corresponding to a pair of X-coordinate and Y-coordinate values.

Reference Characters 1 image capturing device, 2 control circuit, 11 imaging optics, 12 CCD image sensor, 13 front end unit (analog signal processing unit), 14 A/D converter (ADC), 15 drive circuit, 16 timing generator, 20 signal processing unit, 21, 21B image processing device, 22 parameter calculation processor, 23 noise suppression processor, 24 distortion correction processor, 29 filtering control unit, 30 noise suppression unit, 31 spatial filter unit, $31_1$-$31_Q$ low pass filters, $32_1$-$32_Q$ difference calculators, $33_1$-$33_Q$ base noise clip processors, $34_1$-$34_Q$ high clip processors, $35_1$-$35_{Q+1}$ noise suppression strength adjustment units, 36 adder, 37 noise suppression control unit.

What is claimed is:

1. An image processing device comprising:
   a noise suppression unit that executes spatial filtering on a plurality of pixels in a reference range including a pixel of interest in an input image, thereby generating a noise-reduced image;
   a distortion correction processor that locally deforms the noise-reduced image with a magnification factor responsive to a local amount of distortion in the noise-reduced image, thereby correcting distortion of the noise-reduced image; and
   a filtering control unit that dynamically changes a size of the reference range responsive to the magnification factor; wherein
   the filtering control unit narrows the reference range as the magnification factor increases in a circumferential direction extending from an image center of the input image, the circumferential direction being a direction of application of the magnification factor.

2. The image processing device of claim 1, wherein:
   the reference range is set to a prescribed standard reference range when the amount of distortion is zero;
   the distortion correction processor deforms a pixel range corresponding to the reference range in the noise-reduced image, thereby correcting distortion in the pixel range; and
   the filtering control unit determines the reference range such that a size of the deformed pixel range is equal to a size of the standard reference range.

3. The image processing device of claim 1, further comprising a lookup table showing a correspondence between a plurality of values of the magnification factor and a plurality of candidate reference ranges, wherein:
   the filtering control unit refers to the lookup table and selects a candidate reference range corresponding to a current value of the magnification factor from among the plurality of candidate reference ranges.

4. The image processing device of claim 1, wherein the filtering control unit calculates pixel positions defining the reference range on a basis of a current value of the magnification factor.

5. The image processing device of claim 1, further comprising a lookup table indicating a correspondence between a plurality of candidate reference ranges and a plurality of sets of values, each set including a value of the magnification factor and a value of a direction parameter indicating the direction of application, wherein:
   the filtering control unit refers to the lookup table and selects, as the reference range, from among the plurality of candidate reference ranges, a candidate reference range corresponding to a set of values indicating a current value of the magnification factor and a direction of application of the current value.

6. The image processing device of claim 1, wherein the filtering control unit calculates pixel positions defining the reference range by a computational process based on the current value of the magnification factor and the direction of application of the current value.

7. The image processing device of claim 1, wherein the reference range includes first to Q-th reference ranges with mutually differing sizes (Q being a positive integer equal to or greater than 3), and the noise suppression unit comprises:
   first to Q-th spatial filters for executing the spatial filtering separately in the first to Q-th reference ranges, thereby respectively generating first to Q-th filtered images;
   a first difference calculator for generating a first difference image by eliminating spatial frequency components of the first filtered image from the input image;
   second to Q-th difference calculators for respectively generating second to Q-th difference images by respectively eliminating spatial frequency components of the second to Q-th filtered images from the first to Q−1)-th filtered images;
   first to Q-th clip processors for respectively generating first to Q-th clipped images by executing a clip process that converts input signal levels in a specified amplitude range in the first to Q-th difference images to an output signal level with a constant amplitude; and
   an adder for summing the first to Q-th clipped images and the Q-th filtered image to generate the noise-reduced image.

8. The image processing device of claim 7, wherein the first to Q-th reference ranges have sizes set in such a way as to gradually increase in order from the first to the Q-th reference range.

9. The image processing device of claim 7, wherein the first to Q-th clip processors each includes a base clip processor for converting input signal levels in a low amplitude range of levels equal to or less than a first threshold value to a first output signal level with an amplitude less than the first threshold value.

10. The image processing device of claim 9, wherein the first to Q-th clip processors each further include a high clip processor for converting input signal levels in a high amplitude range of levels equal to or greater than a second threshold value to a second output signal level of constant amplitude, the second threshold value being greater than the first threshold value.

11. The image processing device of claim 7, further comprising a noise suppression control unit for dynamically changing the amplitude ranges in the clip processor according to the magnification factor.

12. The image processing device of claim 11, further comprising a noise suppression strength adjustment unit for multiplying the first to Q-th clipped image signals and the Q-th filtered image signal by respective correction coefficients, wherein:
   the noise suppression control unit dynamically changes the correction coefficients responsive to the magnification factor.

13. The image processing device of claim 1, wherein the spatial filtering is low pass filtering.

14. The image processing device of claim 1, wherein:
the input image is an image obtained by photoelectric conversion of an optical image formed by an image optical system; and
the amount of distortion is due to distortion aberration in the imaging optical system.

15. An image capturing device, comprising the image processing device of claim 1.

16. An image processing method, comprising the steps of:
executing spatial filtering on a plurality of pixels in a reference range including a pixel of interest in an input image and generating a noise-reduced image;
locally deforming the noise-reduced image with a magnification factor responsive to a local amount of distortion in the noise-reduced image, thereby correcting distortion of the noise-reduced image; and
dynamically changing a size of the reference range responsive to the magnification factor; wherein
in the step of dynamically changing the reference range, the reference range is dynamically changed by narrowing the reference range as the magnification factor increases in a circumferential direction extending from an image center of the input image, the circumferential direction being a direction of application of the magnification factor.

17. The image processing method of claim 16, wherein:
the reference range is set to a prescribed standard reference range when the amount of distortion is zero;
in the step of correcting the distortion, distortion in the pixel range is corrected by deforming a pixel range corresponding to the reference range in the noise-reduced image; and
the step of dynamically changing the reference range includes a step of determining the reference range so that the deformed pixel range is equal to the standard reference range.

18. A non-transitory computer readable recording medium in which is stored a computer program which, when executed by a processor, performs a method of:
executing spatial filtering on a plurality of pixels in a reference range including a pixel of interest in an input image and generating a noise-reduced image;
locally deforming the noise-reduced image with a magnification factor responsive to a local amount of distortion in the noise-reduced image, thereby correcting distortion of the noise-reduced image; and
dynamically changing a size of the reference range responsive to the magnification factor; wherein
in the step of dynamically changing the reference range, the reference range is dynamically changed by narrowing the reference range as the magnification factor increases in a circumferential direction extending from an image center of the input image, the circumferential direction being a direction of application of the magnification factor.

19. An image processing device comprising:
a processor coupled with a memory including instructions which, when executed by the processor performs a method including:
executing spatial filtering on a plurality of pixels in a reference range including a pixel of interest in an input image and generating a noise-reduced image;
locally deforming the noise-reduced image with a magnification factor responsive to a local amount of distortion in the noise-reduced image, thereby correcting distortion of the noise-reduced image; and
dynamically changing a size of the reference range responsive to the magnification factor; wherein
in dynamically changing the reference range, the reference range is dynamically changed by narrowing the reference range as the magnification factor increases in a circumferential direction extending from an image center of the input image, the circumferential direction being a direction of application of the magnification factor.

* * * * *